(12) United States Patent
Webber

(10) Patent No.: US 7,510,808 B2
(45) Date of Patent: Mar. 31, 2009

(54) LOW TEMPERATURE LI/FES₂ BATTERY

(75) Inventor: Andrew Webber, Avon Lake, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 685 days.

(21) Appl. No.: 10/928,943

(22) Filed: Aug. 27, 2004

(65) Prior Publication Data

US 2006/0046152 A1   Mar. 2, 2006

(51) Int. Cl.
*H01M 6/16* (2006.01)
*H01M 4/36* (2006.01)

(52) U.S. Cl. .................. 429/334; 429/333; 429/326; 429/327; 429/221; 429/231.1; 429/220; 429/218.1; 429/231.95; 429/217; 429/335

(58) Field of Classification Search ............ 429/220, 429/221, 218.1, 231.95, 326, 327, 333, 334, 429/335, 231.8, 217, 231.1
See application file for complete search history.

(56) References Cited

U.S. PATENT DOCUMENTS

| | | | | |
|---|---|---|---|---|
| 3,941,612 | A * | 3/1976 | Steunenberg et al. | 429/221 |
| 4,129,691 | A | 12/1978 | Broussely | 429/197 |
| 4,450,214 | A | 5/1984 | Davis et al. | |
| 4,804,595 | A | 2/1989 | Bakos et al. | |
| 5,432,030 | A | 7/1995 | Vourlis et al. | |
| 5,478,673 | A | 12/1995 | Funatsu | 429/197 |
| 5,514,491 | A | 5/1996 | Webber et al. | |
| 5,691,083 | A | 11/1997 | Bolster et al. | |
| 5,919,587 | A | 7/1999 | Mukherjee et al. | |
| 6,201,100 | B1 | 3/2001 | Gorkovenko et al. | |
| 6,218,054 | B1 | 4/2001 | Webber | |
| 6,436,583 | B1 | 8/2002 | Mikhaylik | 429/340 |
| 6,569,573 | B1 | 5/2003 | Mikhaylik et al. | 429/324 |
| 6,576,373 | B1 | 6/2003 | Iwamoto et al. | 429/347 |
| 6,630,272 | B1 | 10/2003 | Iwamoto et al. | 429/328 |
| 7,019,494 | B2 * | 3/2006 | Mikhaylik | 320/148 |
| 7,189,477 | B2 * | 3/2007 | Mikhaylik | 429/326 |
| 7,316,868 | B2 | 1/2008 | Gorkovenko | |
| 2002/0028389 | A1 | 3/2002 | Sonoda et al. | 429/324 |
| 2002/0039677 | A1 | 4/2002 | Iwamoto et al. | 429/122 |
| 2003/0228518 | A1 | 12/2003 | Marple | |
| 2004/0202936 | A1 | 10/2004 | Mikhaylik | |

FOREIGN PATENT DOCUMENTS

| | | |
|---|---|---|
| EP | 529802 A | 3/1993 |
| EP | 550262 A | 7/1993 |
| EP | 1439591 A | 7/2004 |
| GB | 1522218 A | 8/1978 |
| JP | 59151769 A | 8/1984 |
| JP | 04162363 A | 6/1992 |
| WO | 00/36683 | 6/2000 |
| WO | 0046870 A1 | 8/2000 |
| WO | WO 01/35483 A | 5/2001 |
| WO | WO 2005/069409 A | 7/2005 |
| WO | WO 2005/078851 A | 8/2005 |

* cited by examiner

*Primary Examiner*—Laura S Weiner
(74) *Attorney, Agent, or Firm*—Robert C. Baraona; Russell H. Toye, Jr.

(57) ABSTRACT

The invention is a 1.5 volt primary electrochemical battery cell with an alkali metal lithium negative electrode (such as lithium), a positive electrode (comprising iron disulfide for example) and a nonaqueous electrolyte. The electrolyte has a solute including lithium iodide dissolved in an ether-containing solvent including a 1,2-dimethoxypropane based solvent component and no more than 30 volume percent 1,2-dimethoxyethane. When 1,2-dimethoxypropane is used to replace at least most 1,2-dimethoxyethane in the solvent, the cell provides good discharge capacity at low temperature while maintaining excellent discharge capacity at room temperature.

17 Claims, 1 Drawing Sheet

LOW TEMPERATURE LI/FES$_2$ BATTERY

BACKGROUND

This invention relates to a primary nonaqueous electrolyte electrochemical battery cell, such as a lithium/iron disulfide, with good low temperature performance characteristics.

Batteries are used to provide power to many portable electronic devices. Common advantages of lithium batteries (those that contain metallic lithium or lithium alloy as the electrochemically active material of the negative electrode) include high energy density, good high rate and high power discharge performance, good performance over a broad temperature range, long shelf life and light weight. Lithium batteries are becoming increasingly popular as the battery of choice for new devices because of trends in those devices toward smaller size and higher power. The use of high power consumer devices in low temperature environments is also becoming more common. While lithium batteries can typically operate devices at lower temperatures than batteries with aqueous electrolytes, electrolyte systems that provide the best high power discharge characteristics, even after storage for long periods of time, do not always give the best performance at low temperatures.

One type of lithium battery, referred to below as a Li/FeS$_2$ battery, has iron disulfide as the electrochemically active material of the positive electrode. Li/FeS$_2$ batteries have used electrolyte systems with a wide variety of solutes and organic solvents. The salt/solvent combination is selected to provide sufficient electrolytic and electrical conductivity to meet the cell discharge requirements over the desired temperature range. While the electrical conductivity is relatively low compared to some other common solvents, ethers are often desirable because of their generally low viscosity, good wetting capability, good low temperature discharge performance and good high rate discharge performance. This is particularly true in Li/FeS$_2$ cells because the ethers are more stable than with MnO$_2$ cathodes, so higher ether levels can be used. Among the ethers that have been used are 1,2-dimethoxyethane (DME) and 1,3-dioxolane (DIOX), which have been used together and in blends with other cosolvents. However, because of interactions among solvents, as well as with the electrolyte solutes, cell performance has been difficult to predict based on the properties of individual solvent and solute components.

A wide variety of solutes has been used in Li/FeS$_2$ cell electrolytes; lithium trifluoromethanesulfonate (also commonly referred to as lithium triflate or LiCF$_3$SO$_3$) is among them. An example of a Li/FeS$_2$ cell with a lithium triflate solute in a solvent blend comprising DIOX and DME is found in U.S. Pat. No. 4,952,330, which is hereby incorporated by reference. A solvent blend of 40 to 53 volume percent cyclic ether (e.g., DIOX), 32 to 40 volume percent linear aliphatic ether (e.g., DME) and 8 to 18 volume percent alkylene carbonate (e.g., propylene carbonate) is disclosed. However, such an electrolyte can result in poor cell discharge performance at high discharge rates.

Another example of a cell with an electrolyte containing lithium triflate dissolved in a solvent comprising DIOX and DME is found in U.S. Pat. No. 5,290,414, which is hereby incorporated by reference. A blend of from 1:99 to 45:55 DIOX:DME with an optional cosolvent (e.g., 0.2 weight percent 3,5-dimethylisoxazole (DMI)) is disclosed as a solvent. The disclosed cell had low impedance following storage at high temperature.

While electrolytes containing lithium triflate can provide fair cell electrical and discharge characteristics, such electrolytes have relatively low electrical conductivity, and lithium triflate is relatively expensive. Lithium iodide (LiI) has been used as an improved performance and lower cost alternative to lithium triflate. U.S. Pat. No. 5,514,991, which is hereby incorporated by reference, discloses a cell with improved high rate discharge performance, even after storage at high temperature. LiI is the sole solute, and the electrolyte solvent comprises at least 97 volume percent ether (e.g., 20:80 to 30:70 by volume DIOX:DME, with 0.2 volume percent DMI as a cosolvent).

However, it has been discovered that when LiI is used as the solute in an electrolyte containing DME in the solvent, especially more than 40 volume percent, discharge capacity at low temperatures, such as −20° C. and below, can be very low. This is believed to be due to formation of a DME solvate that can precipitate from the electrolyte solution at low temperatures or otherwise degrade low temperature cell performance. Simply reducing the DME content in the solvent can prevent this problem, but some of the improvement in high rate and high power discharge performance realized with LiI as the solute is sacrificed.

In view of the above, an object of the present invention is to provide a primary nonaqueous electrolyte battery with good discharge characteristics at low temperatures.

Another object is to provide a Li/FeS$_2$ cell with excellent electrical and discharge characteristics, including high rate and high power discharge capacity, over a broad temperature range, including low temperatures.

Another object of the invention is to provide a cell that is economical to produce and has excellent electrical characteristics during and following storage and use at low temperatures.

Yet another object of the invention is to provide a 1.5 volt primary nonaqueous electrolyte cell with a LiI-containing electrolyte with good low temperature electrical performance.

SUMMARY

The above objects are met and the above disadvantages of the prior art are overcome by using an electrolyte comprising a lithium iodide solute dissolved in a solvent blend comprising a 1,2-dimethoxypropane based solvent.

Accordingly, one aspect of the present invention is directed to a primary electrochemical battery cell having a nominal open circuit voltage of 1.5 volts (i.e., suitable as a substitute for other 1.5 volt cell types, such as Li/FeS$_2$ and Zn/MnO$_2$ cells) and comprising a housing, a negative electrode comprising an alkali metal, a positive electrode, a separator disposed between the negative and positive electrodes, and an electrolyte. The electrolyte comprises a solute and an organic solvent, the solute comprises lithium iodide, the solvent comprises one or more ethers, the one or more ethers comprise a 1,2-dimethoxypropane based solvent component, and, when the ethers comprise 1,2-dimethoxyethane, the ethers comprise less than 30 percent by volume 1,2-dimethoxyethane.

A second aspect of the present invention is directed to a primary electrochemical battery cell comprising a housing, a negative electrode comprising metallic lithium, a positive electrode comprising an iron sulfide, a separator disposed between the negative and positive electrodes, and an electrolyte. The electrolyte comprises a solute including lithium iodide and an organic solvent including one or more ethers, at least one of which is a 1,2-dimethoxypropane based solvent component. When the ethers also include 1,2-dimethoxyethane, the ethers contain less than 30 volume percent of the 1,2-dimethoxyethane.

A third aspect of the invention is directed to a primary electrochemical battery cell comprising a housing, a negative electrode comprising metallic lithium, a positive electrode comprising an iron sulfide, a separator disposed between the negative and positive electrodes, and an electrolyte comprising a solute including 0.5 to 2 moles lithium iodide per liter of an organic solvent containing 10 to 90 volume percent 1,2-dimethoxypropane and 10 to 90 volume percent 1,3-dioxolane.

A fourth aspect of the invention is directed to an electrolyte for use in a primary lithium battery cell. The electrolyte comprises a solute and an organic solvent, the solute comprises lithium iodide, the solvent comprises one or more ethers, the one or more ethers comprise a 1,2-dimethoxypropane based solvent component and, when the ethers comprise 1,2-dimethoxyethane, the ethers comprise less than 30 percent by volume 1,2-dimethoxyethane.

These and other features, advantages and objects of the present invention will be further understood and appreciated by those skilled in the art by reference to the following specification, claims and appended drawings.

Unless otherwise specified herein, all disclosed characteristics and ranges are as determined at room temperature (20-25° C.).

DESCRIPTION

Figure 1:
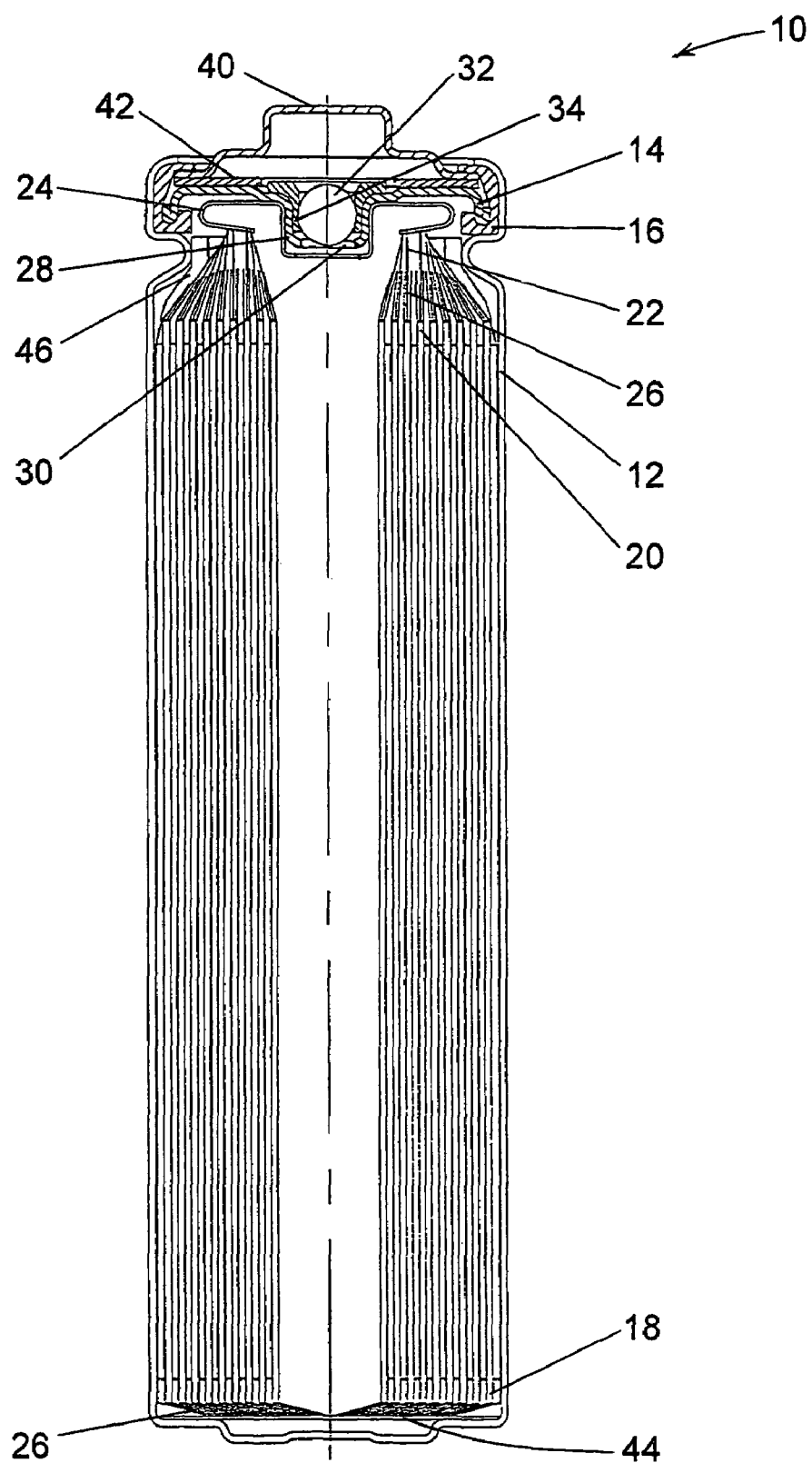
FIG. 1 is an embodiment of a cylindrical cell with a lithium negative electrode, an iron disulfide positive electrode and a nonaqueous organic electrolyte.

The invention will be better understood with reference to FIG. 1, which shows an FR6 type cylindrical battery cell having a housing sealed by two thermoplastic seal members (a gasket and a vent bushing). Cell 10 has a housing that includes a can 12 with a closed bottom and an open top end that is closed with a cell cover 14 and a gasket 16. The can 12 has a bead or reduced diameter step near the top end to support the gasket 16 and cover 14. The gasket 16 is compressed between the can 12 and the cover 14 to seal a negative electrode (anode) 18, a positive electrode (cathode) 20 and electrolyte within the cell 10. The anode 18, cathode 20 and a separator 26 are spirally wound together into an electrode assembly. The cathode 20 has a metal current collector 22, which extends from the top end of the electrode assembly and is connected to the inner surface of the cover 14 with a contact spring 24. The anode 18 is electrically connected to the inner surface of the can 12 by a metal tab (not shown). An insulating cone 46 is located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of the can 12. Cell 10 has a separate positive terminal cover 40, which is held in place by the inwardly crimped top edge of the can 12 and the gasket 16. The can 12 serves as the negative contact terminal. Disposed between the peripheral flange of the terminal cover 40 and the cell cover 14 is a positive temperature coefficient (PTC) device 42 that substantially limits the flow of current under abusive electrical conditions. Cell 10 also includes a pressure relief vent. The cell cover 14 has an aperture comprising an inward projecting central vent well 28 with a vent hole 30 in the bottom of the well 28. The aperture is sealed by a vent ball 32 and a thin-walled thermoplastic bushing 34, which is compressed between the vertical wall of the vent well 28 and the periphery of the vent ball 32. When the cell internal pressure exceeds a predetermined level, the vent ball 32, or both the ball 32 and bushing 34, are forced out of the aperture to release pressurized gases from the cell 10.

Electrolytes for cells according to the invention are nonaqueous electrolytes. In other words, they contain water only in very small quantities (preferably no more than about 500 parts per million by weight) as a contaminant. The electrolyte comprises a LiI solute dissolved in an organic solvent. The solute can comprise one or more additional soluble salts. An example is $LiCF_3SO_3$. Other examples include $LiClO_4$, $Li(CF_3SO_2)_2N$, $Li(CF_3CF_2SO_2)_2N$, $Li(CF_3SO_2)_3C$ and lithium bis(oxalato)borate. Preferably the total amount of solute in the electrolyte is 0.5 to 2 moles per liter of solvent. When the solute includes other components, the LiI preferably comprises at least 25 weight percent of the total solute.

The solvent comprises one or more ethers, preferably with a total of greater than 50 volume percent, and more preferably with a total of at least 90 volume percent, ether in the solvent. However, the solvent contains little (less than 30 volume percent) or no DME. Instead, a 1,2-dimethoxypropane (DMP) based solvent component (1,2-dimethoxypropane or a substituted 1,2-dimethoxypropane) replaces at least a portion of the DME. Examples of a substituted DMP include alkyl- and alkoxy-substituted DMP, such as 1,2-dimethoxybutane and 1,2-diethoxypropane. If DME is included in the solvent, the ratio of DMP based component to DME is preferably at least 2 to 1 and more preferably at least 5 to 1. Most preferably the solvent comprises no DME. If too much DME is present cell performance at low temperature can be poor. This is believed to be due to the formation of soluble or insoluble DME solvates of the lithium salt. The DMP based component provides many of the advantages of DME but does not appear to form a detrimental solvate with the LiI at low temperatures. The solvent preferably includes 10 to 90, and more preferably 40 to 80, volume percent of the DMP based solvent component.

The solvent can include other ethers in addition to the DMP based component. A DIOX based solvent component (1,3-dioxolane or a substituted 1,3-dioxolane) is a preferred ether. In a preferred embodiment the solvent comprise 10 to 90 volume percent of a DIOX based component. Examples of substituted DIOX include alkyl- and alkoxy-substituted DIOX, such as 2-methyl-1,3-dioxolane and 4-methyl-1,3-dioxolane. When the solvent includes a DIOX based component, the DIOX based component is more preferably at least 20 percent of the total solvent volume, and more preferably the DIOX based component is no more than 75 percent of the total volume of solvent.

The solvent can also include additional components, examples of which include ethylene carbonate, propylene carbonate, 1,2-butylene carbonate, 2,3-butylene carbonate, vinylene carbonate, methyl formate, γ-butyrolactone, sulfolane, acetonitrile, 3,5-dimethylisoxazole, N,N-dimethyl formamide, N,N-dimethylacetamide, N,N-dimethylpropyleneurea, 1,1,3,3-tetramethylurea, 3-methyl-2-oxazolidinone and ethers such as 1,2-dimethoxyethane, 1,2-diethoxyethane, diglyme, triglyme, tetraglyme, methyltetrahydrofurfurylether, diethyl ether, tetrahydrofuran, 2-methyl tetrahydrofuran, 2-methoxytetrahydrofuran and 2,5-dimethoxytetrahydrofuran. 3,5-Dimethylisoxazole is a preferred additional solvent component. Preferably the solvent contains less than 50, more preferably less than 10, volume percent of non-ether solvent components. Preferably the solvent contains no dialkyl or cyclic carbonates.

The anode contains an alkali metal, such as a lithium, sodium or potassium metal, often in the form of a sheet or foil. The composition of the alkali metal can vary, though the purity is always high. The alkali metal can be alloyed with other metals, such as aluminum, to provide the desired cell electrical performance. A preferred alkali metal is a lithium metal. When the anode is a solid piece of lithium, a separate current collector within the anode is generally not used, since the lithium metal has a very high electrical conductivity. However, when a separate current collector is used, the current collector can be made from a copper or copper alloy metal.

The cathode contains one or more active materials which, when coupled with the anode in the cell results in a nominal cell open circuit voltage of 1.5 volts. Preferred active cathode materials include iron sulfides (e.g., FeS and $FeS_2$), more preferably iron disulfide ($FeS_2$), usually in particulate form. Examples of other active materials include oxides of bismuth, such as $Bi_2O_3$, as well as CuO, $Cu_2O$, CuS and $Cu_2S$. Other active materials can also be used, as long as the nominal cell voltage is 1.5 volts. In addition to the active material, the cathode generally contains one or more electrically conductive materials such as metal or carbon (e.g., graphite, carbon black and acetylene black). A binder may be used to hold the particulate materials together, especially for cells larger than button size. Small amounts of various additives may also be included to enhance processing and cell performance. The particulate cathode materials can be formed into the desired electrode shape and inserted into the cell, or they can be applied to a current collector. For example, a coating can be applied to a thin metal foil strip for use in a spirally wound electrode assembly, as shown in FIG. 1. Aluminum is a commonly used material for the cathode current collector.

Any suitable separator material may be used. Suitable separator materials are ion-permeable and electrically nonconductive. They are generally capable of holding at least some electrolyte within the pores of the separator. Suitable separator materials are also strong enough to withstand cell manufacturing and pressure that may be exerted on them during cell discharge without tears, splits, holes or other gaps developing. Examples of suitable separators include microporous membranes made from materials such as polypropylene, polyethylene and ultrahigh molecular weight polyethylene. Preferred separator materials for $Li/FeS_2$ cells include CELGARD® 2400 and 2500 microporous polypropylene membranes (from Celgard Inc., Charlotte, N.C., USA) and Tonen Chemical Corp.'s Setella F20DHI microporous polyethylene membrane (available from ExxonMobile Chemical Co, Macedonia, N.Y., USA). A layer of a solid electrolyte, a polymer electrolyte or a gel-polymer electrolyte can also be used as a separator.

Specific anode, cathode and electrolyte compositions and amounts can be adjusted and the separator selected to provide the desired cell manufacturing, performance and storage characteristics. U.S. Patent Publication No. US 2003/0228518 A1, published on Dec. 11, 2003 and which is hereby incorporated by reference, discloses a $Li/FeS_2$ cell with high energy density and discharge efficiency. Electrolyte according to the present invention can be used advantageously in such a cell.

The cell container is often a metal can with an integral closed bottom, though a metal tube that is initially open at both ends may also be used instead of a can. The can is generally steel, plated with nickel on at least the outside to protect the outside of the can from corrosion. The type of plating can be varied to provide varying degrees of corrosion resistance or to provide the desired appearance. The type of steel will depend in part on the manner in which the container is formed. For drawn cans the steel can be a diffusion annealed, low carbon, aluminum killed, SAE 1006 or equivalent steel, with a grain size of ASTM 9 to 11 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The cell cover is typically metal. Nickel plated steel may be used, but a stainless steel is often desirable, especially when the cover is in electrical contact with the cathode. The complexity of the cover shape will also be a factor in material selection. The cell cover may have a simple shape, such as a thick, flat disk, or it may have a more complex shape, such as the cover shown in FIG. 1. When the cover has a complex shape like that in FIG. 1, a type 304 soft annealed stainless steel with ASTM 8-9 grain size may be used, to provide the desired corrosion resistance and ease of metal forming. Formed covers may also be plated, with nickel for example.

The terminal cover should have good resistance to corrosion by water in the ambient environment, good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The gasket comprises a thermoplastic material that is resistant to cold flow at high temperatures (e.g., 75° C. and above), chemically stable (resistant to degradation, e.g., by dissolving or cracking) when exposed to the internal environment of the cell and resistant to the transmission of air gases into and electrolyte vapors from the cell. Gaskets can be made from thermoplastic resins. For a cell with an electrolyte having a high ether content, preferred resins comprise polypropylene, polyphthalamide and polyphenylene sulfide. Examples include PRO-FAX®6524 grade polypropylene from Basell Polyolefins, Wilmington, Del., USA; RTP 4000 grade polyphthalamide from RTP Company, Winona, Minn., USA; AMODEL® ET 1001 L (polyphthalamide with 5-40 weight percent impact modifier) from Solvay Advanced Polymers, LLC, Alpharetta, Ga., USA; and FORTRON® SKX 382 (polyphenylene sulfide with about 15 weight percent impact modifier) from Ticona-US, Summit, N.J., USA.

To improve the seal at the interfaces between the gasket and the cell container and the cell cover, the gasket can be coated with a suitable sealant material. A polymeric material such as ethylene propylene diene terpolymer (EPDM) can be used in embodiments with an organic electrolyte solvent.

In one embodiment of an FR6 $Li/FeS_2$ cell according to FIG. 1, the upstanding side wall of the gasket is 0.0205 inch (0.521 mm) thick as manufactured. The diameters of the cell cover, gasket and crimped can are such that the gasket is compressed by about 30 percent of its original thickness to provide a good seal. The gasket is preferably coated with a sealant such as EPDM, but other suitable sealant materials can be used. The initial vent bushing wall thickness is 0.0115 inch (0.292 mm). It is compressed by about 30 to 35 percent of its original thickness in the sealed cell. A sealant could be used between the vent bushing and the cell cover or between the vent bushing and the vent ball, or a sealant could be applied over the cover, bushing and ball to improve the seal, but preferably no sealant is used.

The vent bushing is a thermoplastic material that is resistant to cold flow at high temperatures (e.g., 75° C. and above). The resin can be formulated to provide the desired sealing, venting and processing characteristics. For example, the base resin can be modified by adding a thermal-stabilizing filler to provide a vent bushing with the desired sealing and venting characteristics at high temperatures. Suitable polymeric base resins include ethylene-tetrafluoroethylene, polyphenylene sulfide, polyphthalamide, ethylene-chlorotrifluoroethylene, chlorotrifluoroethylene, perfluoroalkoxyalkane, fluorinated perfluoroethylene polypropylene and polyetherether ketone. Ethylene-tetrafluoroethylene copolymer (ETFE), polyphenylene sulfide (PPS) and polyphthalamide (PPA) are preferred. Fillers may be inorganic materials, such as glass, clay, feldspar, graphite, mica, silica, talc and vermiculite, or they may be organic materials such as carbons. An example of a suitable thermoplastic resin is TEFZEL® HT2004 (ETFE resin with 25 weight percent chopped glass filler) from E.I. du Pont de Nemours and Company, Wilmington, Del., USA.

It is generally preferred that the wall of the vent bushing between the vent ball and the vent well in the cover be thin (e.g., 0.006 to 0.015 inch as manufactured) and be compressed by about 25 to 40 percent when the bushing and ball are inserted into the cover.

The vent ball can be made from any suitable material that is stable in contact with the cell contents and provides the desired cell sealing and venting characteristic. Glasses or metals, such as stainless steel, can be used. The vent ball should be highly spherical and have a smooth surface finish with no imperfections, such as gouges, scratches or holes visible under 10 times magnification. The desired sphericity and surface finish depend in part on the ball diameter. For example, in one embodiment of a Li/FeS$_2$ cell, for balls about 0.090 inch (2.286 mm) in diameter the preferred maximum sphericity is 0.0001 inch (0.00254 mm) and the preferred surface finish is 3 microinches (0.0762 µm) RMS maximum. For balls about 0.063 inch (1.600 mm) in diameter, the preferred maximum sphericity is 0.000025 inch (0.000635 mm), and the preferred maximum surface finish is 2 microinches (0.0508 µm) RMS.

The cell can be closed and sealed using any suitable process. Such processes may include, but are not limited to, crimping, redrawing, collecting, gluing and combinations thereof. For example, for the cell in FIG. 1, a bead is formed in the can after the electrodes and insulator cone are inserted, and the gasket and cover assembly (including the cell cover, contact spring and vent bushing) are placed in the open end of the can. The cell is supported at the bead while the gasket and cover assembly are pushed downward against the bead. The diameter of the top of the can above the bead is reduced with a segmented collect to hold the gasket and cover assembly in place in the cell. After electrolyte is dispensed into the cell through the apertures in the vent bushing and cover, a vent ball is inserted into the bushing to seal the aperture in the cell cover. A PTC device and a terminal cover are placed onto the cell over the cell cover, and the top edge of the can is bent inward with a crimping die to retain the gasket, cover assembly, PTC device and terminal cover and complete the sealing of the open end of the can by the gasket.

The above description is particularly relevant to FR6 type cylindrical Li/FeS$_2$ cells with nonaqueous electrolytes and to pressure relief vents comprising a thermoplastic bushing and vent ball. However, the invention may also be adapted to other types of cells, such as button cells, non-cylindrical (e.g., prismatic) cells and cells with other pressure relief vent designs. For example, the aperture and pressure relief vent can be located in a cell cover or the container. Cells according to the invention can have spiral wound electrode assemblies, such as that shown in FIG. 1, or another electrode configuration, such as folded strips, stacked flat plates, bobbins and the like.

The invention and its features and advantages are further illustrated in the following examples.

EXAMPLE 1

FR6 type Li/FeS$_2$ cells similar to cell 10 in FIG. 1 were made. For each cell a 0.95 gram, 15.24 mm (0.006 in.) thick strip of lithium metal was used as the anode. For some lots, indicated below, the lithium metal was a lithium alloy containing 0.5 weight percent aluminum. The cathode contained a mixture of 92.75 weight percent FeS$_2$, 2.5 weight percent acetylene black, 2.25 weight percent graphite, 2.0 weight percent ethylene/propylene copolymer and 0.05 weight percent polyethylene oxide; a total of 3.97 g of the mixture was coated onto both sides of a 0.0254 mm (0.001 in.) thick strip of aluminum foil. The cells were assembled as described above, using an average of about 1.5 to 2 milliliters of electrolyte per cell. A different electrolyte was used in each lot of cells, as described in Table 1. After assembly the cells were predischarged (removing about 180 mAh of the cell capacity). Lots A through G are comparative cells. Lot H is an embodiment of the invention.

TABLE 1

| Lot | Solute Type | Conc. (moles/liter of solvent) | Solvent Component (volume ratio) | | | | Li—Al Alloy |
|---|---|---|---|---|---|---|---|
| | | | DIOX | DME | DMI | DMP | |
| A | LiCF$_3$SO$_3$ | 1.0 | 25 | 75 | 0.2 | | yes |
| B | LiCF$_3$SO$_3$ | 1.0 | 25 | 75 | 0.2 | | no |
| C | LiCF$_3$SO$_3$ | 0.75 | 25 | 75 | 0.2 | | no |
| D | LiI | 0.75 | 25 | 75 | 0.2 | | no |
| E | LiCF$_3$SO$_3$ | 1.0 | 25 | 75 | | | yes |
| F | LiCF$_3$SO$_3$ | 0.75 | 25 | 75 | | | no |
| G | LiI | 0.75 | 25 | 75 | | | no |
| H | LiI | 0.75 | 25 | | | 75 | yes |

EXAMPLE 2

Cells from Example 1 were discharged at a 3.9 ohm constant resistance. The tests and results are summarized in Table 2.

TABLE 2

| | Solute | | 3.9 Ω Cont. to 0.75 V | | 3.9 Ω 1 hr./day to 0.9 V | |
|---|---|---|---|---|---|---|
| Lot | Type | Conc. (moles/liter of solvent) | Room Temp. | −20° C. | Room Temp. | −20° C. |
| A | LiCF$_3$SO$_3$ | 1.0 | 2377 mAh | | 2379 mAh | 1888 mAh |
| B | LiCF$_3$SO$_3$ | 1.0 | | 2058 mAh | | 1543 mAh |
| C | LiCF$_3$SO$_3$ | 0.75 | 2400 mAh | | | 1526 mAh |
| D | LiI | 0.75 | | | | 84 mAh |
| E | LiCF$_3$SO$_3$ | 1.0 | 2452 mAh | 1782 mAh | 2408 mAh | 1892 mAh |
| F | LiCF$_3$SO$_3$ | 0.75 | 2448 mAh | 1651 mAh | | |
| G | LiI | 0.75 | | 13 mAh | | |
| H | LiI | 0.75 | 2374 mAh | 1940 mAh | | |

The differences among lots at room temperature were small. Capacities were close to 2400 mAh with all of the electrolyte compositions on both of the tests at room temperature. The capacities at −20° C. are lower on both tests.

When LiI was substituted for $LiCF_3SO_3$ in the electrolyte used in Lot C (see Lot D) and Lot F (see Lot G), the discharge capacities at −20° C. were extremely low. However, in Lot H, where DMP was substituted for the DME in the electrolyte in Lot G, the 3.9 ohm continuous discharge capacity at −20° C. was substantially improved, to a level at least as good as with the corresponding $LiCF_3SO_3$ electrolyte in Lot F.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A primary electrochemical battery cell, wherein the cell is a primary cell comprising a housing, a negative electrode comprising metallic lithium, a positive electrode, a separator disposed between the negative and positive electrodes, and an electrolyte, and wherein:
   the positive electrode comprises $FeS_2$ and, optionally, one or more members selected from the group consisting of FeS, $Bi_2O_3$, CuO, $Cu_2O$, CuS and $CuS_2$;
   the electrolyte consists essentially of at least one solute and an organic solvent;
   wherein the solute comprises lithium iodide;
   wherein the organic solvent consists essentially of: (i) a 1,2-dimethoxypropane based solvent, (ii) 1,2-dimethoxyethane, (iii) an optional ether based cosolvent, and (iv) an optional non-ether based cosolvent that, when present, is less than 10 vol. % of the organic solvent and contains no dialkyl carbonates or cyclic carbonates; and
   wherein the volume ratio of the 1,2-dimethoxypropane based solvent to the 1,2-dimethoxyethane is at least 2 to 1.

2. The cell defined in claim 1, wherein the volume ratio of the 1,2-dimethoxypropane based component to the 1,2-dimethoxyethane is at least 5 to 1.

3. The cell defined in claim 1, wherein the 1,2-dimethoxypropane based component is 1,2-dimethoxypropane.

4. The cell defined in claim 1, wherein, when present, the optional ether based solvent is a 1,3-dioxolane based component.

5. The cell defined in claim 4, wherein the 1,3-dioxolane based component is no greater than 75 percent of the total volume of the solvent.

6. The cell defined in claim 4, wherein the 1,3-dioxolane based component is at least 20 percent of the total volume of the solvent.

7. The cell defined in claim 4, wherein the 1,3-dioxolane based component is 20 to 75 percent of the total volume of the solvent.

8. The cell defined in claim 4, wherein the 1,3-dioxolane based component is 1,3-dioxolane.

9. The cell defined in claim 1, wherein the optional non-ether based solvent is 3,5-dimethylisoxazole.

10. The cell defined in claim 1, wherein the electrolyte comprises 0.5 to 2 moles of solute per liter of solvent.

11. The cell defined in claim 1, wherein the solute further comprises at least one additional salt selected from the group consisting of: $LiClO_4$, $Li(CF_3SO_2)_2N$, $Li(CF_3CF_2SO_2)_2N$, $Li(CF_3SO_2)_3C$ and lithium bis(oxalate)borate.

12. The cell defined in claim 11, wherein the solute comprises at least 5 weight percent lithium iodide.

13. The cell defined in claim 1, wherein the metallic lithium comprises an alloy of lithium.

14. The cell defined in claim 13, wherein the alloy comprises aluminum.

15. The cell defined in claim 1, wherein the positive electrode further comprises a mixture of $FeS_2$ and carbon.

16. The cell defined in claim 15, wherein the mixture further comprises a binder and said mixture is coated onto a metal current collector.

17. A primary electrochemical battery cell comprising:
    a housing;
    a negative electrode consisting essentially of lithium or a lithium alloy;
    a positive electrode having a cathode coating disposed on a metallic current collector, said cathode coating comprising $FeS_2$ and, optionally, one or more members selected from the group consisting of: carbon, a binder, FeS, $Bi_2O_3$, CuO, $Cu_2O$, CuS and $CuS_2$;
    a separator disposed between the negative electrode and the positive electrode;
    an electrolyte consisting essentially of at least one solute and a blend of organic solvents, said solute being at least one selected from the group consisting of: lithium iodide, $LiClO_4$, $Li(CF_3SO_2)_2N$, $Li(CF_3CF_2SO_2)_2N$, $Li(CF_3SO_2)_3C$ and lithium bis(oxalate)borate and said blend of organic solvents consisting essentially of: (i) 1,2-dimethoxypropane, (ii) 1,2-dimethoxyethane, (iii) an optional ether based cosolvent, and (iv) an optional non-ether based cosolvent that, when present, is less than 10 vol. % of the organic solvent and contains no dialkyl carbonates or cyclic carbonates; and
    wherein the volume ratio of the 1,2-dimethoxypropane to the 1,2-dimethoxyethane is at least 2 to 1.

* * * * *